No. 830,009. PATENTED SEPT. 4, 1906.
A. E. SALISBURY.
RAT TRAP.
APPLICATION FILED MAR. 14, 1906.
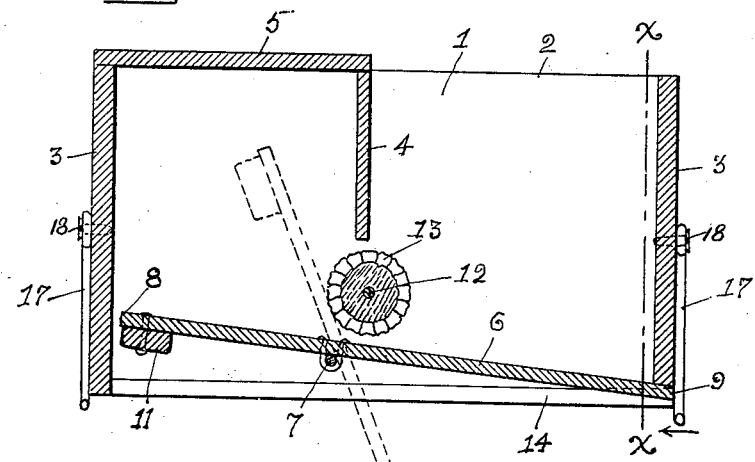
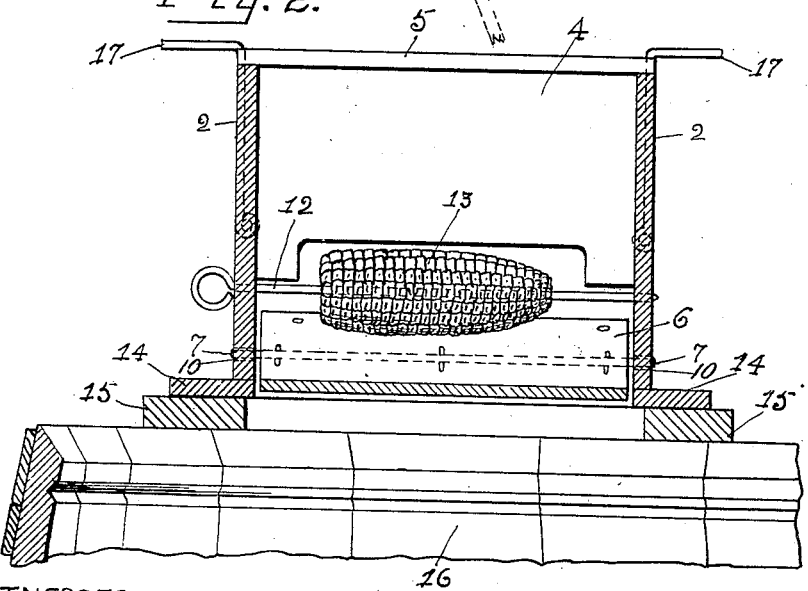
WITNESSES:
D. C. Walter
C. A. Boare
INVENTOR.
Alson E. Salisbury
by Robt. B. Wilson
Attorney

UNITED STATES PATENT OFFICE.

ALSOM E. SALISBURY, OF TOLEDO, OHIO.

RAT-TRAP.

No. 830,009.　　　Specification of Letters Patent.　　　Patented Sept. 4, 1906.

Application filed March 14, 1906. Serial No. 305,948.

*To all whom it may concern:*

Be it known that I, ALSOM E. SALISBURY, a citizen of the United States, residing at Toledo, in the county of Lucas and State of Ohio, have invented a new and useful Improvement in Rat-Traps, of which the following is a specification.

My invention relates to a rat-trap, and has for its object to provide an automatic device of the kind that is simple and inexpensive, as well as effective, for the purpose of destroying rats and like vermin without arousing suspicion of its character in the wily animals it is intended to destroy and that is perpetually set, baited, open, and ready to receive all comers and quickly drown them without opportunity to give warning of danger to those who are tempted to follow.

I accomplish these objects by constructing a trap as hereinafter described and illustrated in the drawings, in which—

Figure 1 is a vertical longitudinal section of a trap constructed in accordance with my invention, and Fig. 2 is a cross-section of the same on line $x\,x$ of Fig. 1.

In the drawings, 1 represents a plain oblong rectangular box, which is preferably made of rough exterior finish resembling an ordinary packing-box that has been some time used. The length of the sides 2 of the box is preferably about twice the width of the ends 3, and central between the ends and parallel therewith is a partition 4, which extends from flush with the tops of the sides part way only toward the bottom edges of the sides, the distance between the top and bottom edges of the partition being preferably slightly less than the length of the body of a full-grown rat. One-half the box 1 is provided with a cover 5, which is secured to the tops of the sides and of the partition and one end.

The box is provided with a trap-bottom 6, which is of a width to enter freely between the sides 2 and of a length to extend from near the end 3 at the covered end of the box to flush with the outer side of the opposite end 3, the bottom edges of which are far enough above the bottom edges of the sides to allow the trap-bottom 6 to enter between the sides. The trap-bottom is fixedly mounted on a rod 7, which extends transverse the bottom nearer to the end, 8, that is beneath the cover 5 than to the opposite end 9. The rod 7 has end portions that extend beyond the side edges of the bottom, which are journaled in suitable orifices 10 in the sides. To cause the bottom thus pivoted off its center to normally maintain a position closing the bottom of the box, it is provided near its inner end with a weight 11, which is just sufficient to overbalance the longer end portion, so that the weight of a rat on the latter will overbalance the weight and tip the end 9 downward. In the opening between the lower edge of the partition 4 and the trap-bottom 6 the sides 2 are oppositely pierced to receive and journal a bait-rod 12, which is pointed at one end to adapt it to be driven lengthwise through the pithy core of the cob of an ear of corn 13, as shown in Fig. 2.

Flush with the bottom edges of the sides 2, on their outer sides, there are secured the cleats 14, which adapt the box 1 to be mounted upon boards 15, laid over the open top of a barrel 16, partly filled with water without interfering with the pivotal movement of the trap-bottom. When so mounted in a place infested by rats, with the top of the barrel entirely covered by the trap and the boards and with other boxes or the like placed as if carelessly around the barrel to afford convenient means of access to the top of the trap or the barrel, the trap is set. There being nothing in this situation to excite the suspicion of the rats, the keenness of their scent will disclose to them the presence of the corn, which they will speedily locate, and, being found in an open-top box, they will have no hesitancy in jumping down into the uncovered portion of box 1 to get at it, which results in their being at once precipitated by the tilting of the trap-bottom into the water in the barrel and their speedy death by drowning. Their disappearance is so sudden that it creates no alarm among the rats that follow the first comers.

Should a rat crawl down from the top of the box along the partition in an effort to reach the ear of corn, as soon as his fore feet are placed on the ear it unexpectedly rolls under his weight, and the rat is precipitated onto the trap-bottom with the result that it instantaneously disappears into the barrel, and the trap-bottom so quickly returns to its normal position that no time is allowed the rat to give any warning to other rats that may be near, and they follow only to meet the same fate.

The box 1 is preferably provided with four hooks 17 for suspending the trap. The hooks are pivoted on screws 18, located one opposite each end of the sides 2. When the trap is mounted on top of a barrel by the cleats 14, as shown in Fig. 2, the hooks hang pendent, as shown in Fig. 1. When it is desired to vary the situation and surroundings of the trap, it may be suspended by the hooks from the boards 15 within the top of the barrel 16. When the trap is so suspended, the hooks will be in raised position, as illustrated in dotted and full lines in Fig. 2.

What I claim to be new is—

The herein-described rat-trap comprising an oblong rectangular box, provided with a tilting bottom weighted at one end to slightly overbalance the opposite end and maintain the bottom normally in position closing the bottom of the box, a top for that portion of the box which is closed by the weighted end portion of the tilting bottom, a cross-partition in the box at the inner end of the top cover, extending from the cover downward toward the tilting bottom, a bait-rod transverse the box in the plane of the partition, and having its end portions journaled in the sides of the box between the partition and the tilting bottom, said rod being adapted to be inserted lengthwise through an ear of corn and revolubly support the ear, and means to support the box over water in an open-top vessel.

In witness whereof I have hereunto signed my name, in the presence of two subscribing witnesses, this 6th day of March, 1906.

ALSOM E. SALISBURY.

In presence of—
 J. C. SCHEUFLER,
 GEO. P. KIRBY.